United States Patent [19]

Brooks

[11] Patent Number: 4,619,380

[45] Date of Patent: Oct. 28, 1986

[54] ICE DISPENSER FOR A HOUSEHOLD REFRIGERATOR

[75] Inventor: Robert B. Brooks, Louisville, Ky.

[73] Assignee: General Electric Company, Louisville, Ky.

[21] Appl. No.: 630,866

[22] Filed: Jul. 13, 1984

[51] Int. Cl.⁴ .................. B65G 33/00; F25C 5/18
[52] U.S. Cl. .................. 222/240; 222/146.6; 222/413
[58] Field of Search .............. 222/146.6, 236, 263, 222/239–242, 412, 413, 510, 252; 221/75; 198/676, 666, 659; 62/344

[56] References Cited

U.S. PATENT DOCUMENTS

| | | | |
|---|---|---|---|
| 377,821 | 2/1888 | Wissler | 198/676 X |
| 1,226,278 | 5/1917 | Teves | 222/413 |
| 3,186,602 | 6/1965 | Ricciardi | 222/161 |
| 3,266,265 | 8/1966 | Winkler | 62/344 |
| 3,422,994 | 1/1969 | Alvarez | 222/240 |
| 3,437,244 | 4/1969 | Alvarez et al. | 222/240 |
| 3,602,406 | 8/1971 | Jacobus et al. | 222/413 |
| 3,707,224 | 12/1972 | Rastoin | 198/659 |
| 3,710,983 | 1/1973 | Ricciardi | 222/241 X |
| 3,806,002 | 4/1974 | Mills et al. | 222/413 X |
| 3,858,765 | 1/1975 | Landers | 222/413 |
| 3,861,561 | 1/1975 | Wittern et al. | 221/75 |
| 3,874,559 | 4/1975 | Pink | 222/146.6 |
| 4,084,725 | 4/1978 | Buchser | 221/75 |
| 4,160,514 | 7/1979 | Taupin | 222/413 X |
| 4,167,238 | 9/1979 | Koski | 222/413 |
| 4,512,502 | 4/1985 | Landers | 222/240 X |

*Primary Examiner*—Joseph J. Rolla
*Assistant Examiner*—Kevin P. Shaver
*Attorney, Agent, or Firm*—Frederick P. Weidner; Radford M. Reams

[57] ABSTRACT

An ice dispenser comprising a receptacle for storing ice pieces and having a front discharge opening. Supported in the receptacle is a cylindrical, rotatable, feed section having the outer end thereof positioned adjacent the receptacle discharge opening and the inner end thereof having an opening to receive ice pieces. A rotatable wire auger comprising an elongate axial portion is secured to the cylindrical, rotatable, feed section at one end and at the opposite end to a helically coiled portion concentric therewith and spaced therefrom. The helically coiled portion has a terminal end spaced from the feed section and the axial portion of the auger. A drive arrangement is provided to rotate the feed section and auger.

7 Claims, 5 Drawing Figures

ICE DISPENSER FOR A HOUSEHOLD REFRIGERATOR

BACKGROUND OF THE INVENTION

The present invention relates to an ice piece dispenser for a conventional household refrigerator and more specifically to an ice dispenser of the type disclosed and claimed in U.S. Pat. No. 3,422,994 issued Jan. 21, 1969 and U.S. Pat. No. 3,437,244 issued Apr. 8, 1969. Briefly described, such a dispenser comprises a receptacle for receiving and storing ice pieces from an automatic ice maker and dispensing means rotatably supported in a horizontal position within the receptacle so that, upon operation thereof, ice pieces will be automatically dispensed through a discharge opening in the front end of the receptacle. The dispensing means comprises a feed section for feeding ice pieces to the discharge opening and a conveying section connected to the feed section and rotatable therewith. The feed section comprises a cylindrical collar containing therein a conveyor screw or metering helix rotatable with the collar and the discharge opening is positioned relative to the outlet of the feed section. The feed section also adjusts the delivery rate of the ice pieces to prescribed limits for user convenience and also provides a moderate flow rate of ice pieces independently of the reservoir or receptacle fill level.

To continually move ice pieces into the rotatable feed section there is employed a collector wire auger having a helically coiled portion connected at one end to the feed section and the other end is connected to drive means for rotating the wire helical auger and feed section. The transition from the collector wire auger to the metering helix in the collar of the feed section is accomplished by maintaining a transition pool of continually moving ice pieces at the auger output and allowing the ice pieces to fall into the metering helix within the collar of the feed section as they randomly present themselves in the proper position and orientation.

The usual construction of the collector wire auger presents an impediment to the smooth flow of ice pieces to the metering helix in the feed section. The reason for this impediment is that the wire auger bends sharply from a helix to become an axial shaft coincident with the helix center axis. This shaft is then extended to become the central axis and drive shaft for the metering helix in the feed section. It is this sharp bend or crook in the wire, which occurs directly in the transition pool of ice pieces that is destructive of the smooth delivery flow of ice pieces into the feed section. Moreover, it has been found that clumps of ice pieces tend to form about the helically coiled portion of the wire auger and as it is rotating the clumps of ice pieces travel toward the feed section where they become lodged on the crook section and then rotate with the auger thereby disrupting the flow of free ice pieces into the feed section.

By this invention there is provided a different shape wire auger that enhances the smooth flow of ice pieces from the receptacle into the feed section and also helps dispose of the accumulation of clumps of ice about the helically coiled portion of the wire auger.

SUMMARY OF THE INVENTION

There is provided an ice piece dispenser comprising a receptacle for storing ice pieces and having a front discharge opening. Dispensing means are supported in the receptacle and include a cylindrical, rotatable feed section having the outer end thereof positioned adjacent said discharge opening and the inner end thereof having an opening to receive ice pieces. A rotatable wire auger comprising an elongate axial portion is secured to the cylindrical, rotatable feed section at one end and at the opposite end to a helically coiled portion concentric therewith and spaced therefrom, said helically coiled portion having a terminal end spaced from the feed section and the axial portion of the auger. There is provided drive means to rotate the feed section and auger.

BRIEF DESCRIPTION OF THE DRAWINGS

FIG. 3 is a partial front view of the dispenser illustrating certain additional details thereof.

FIG. 4 is a plan view of the end of the wire auger of the present invention attached to the drive means.

FIG. 5 is a plan view of the wire auger showing the end opposite the end shown in FIG. 4.

DESCRIPTION OF THE PREFERRED EMBODIMENT

Figure 1:
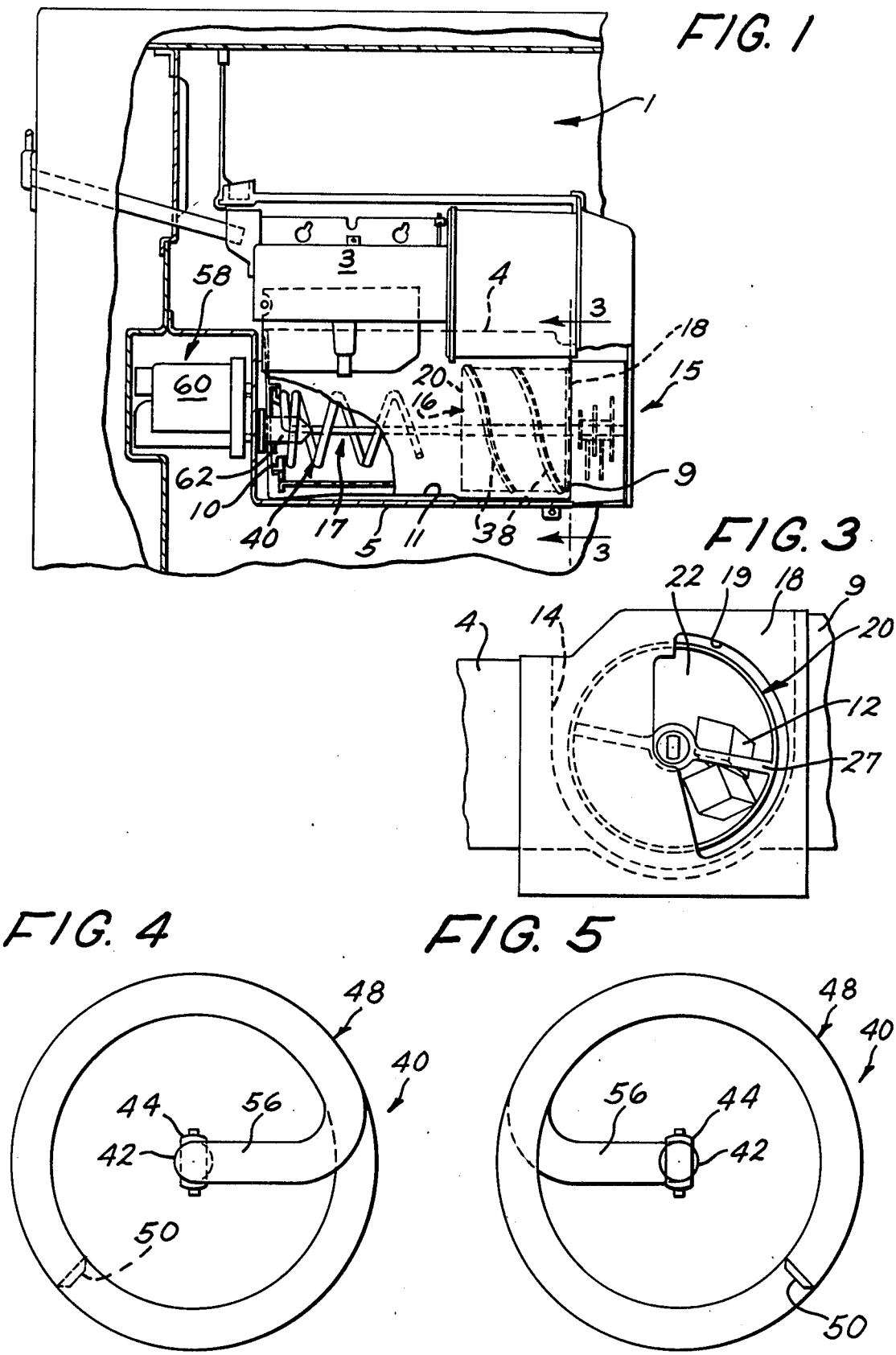
FIG. 1 is a sectional side view of a portion of the freezer compartment of a household refrigerator including the ice dispensing means of the present invention.
Figure 2:
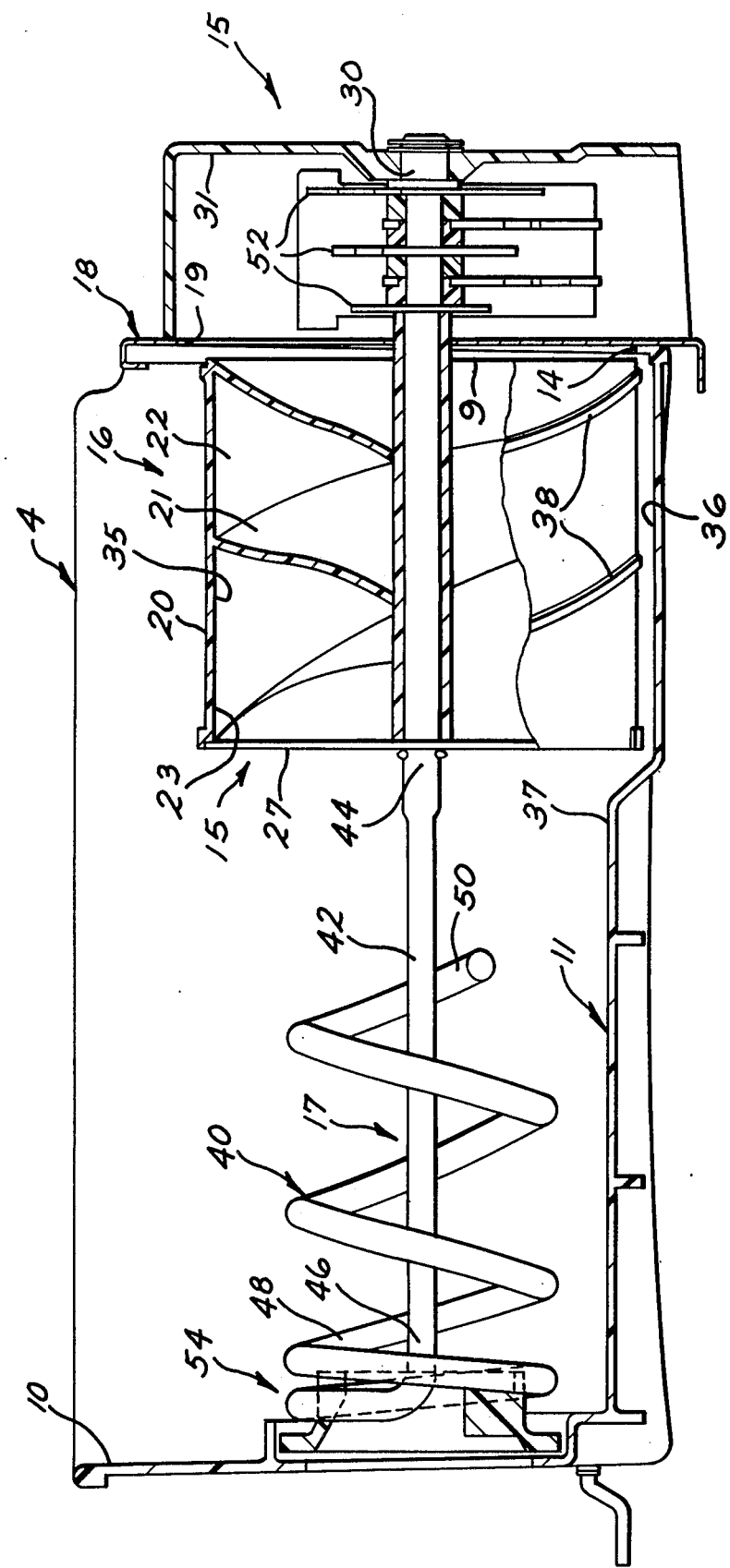
FIG. 2 is an enlarged sectional view of the ice dispensing means illustrated in FIG. 1.

In FIGS. 1, 2 and 3 of the drawing, there is illustrated a household refrigerator comprising a freezer compartment 1 having an access opening at the front thereof closed by a door (not shown). Within the upper portion of the freezer compartment 1, there is mounted an automatic ice maker 3 which may be of the well-known types presently provided in household refrigerators for the automatic production of ice pieces, generally referred to as ice cubes regardless of their particular shapes. These ice pieces are discharged into a storage bin or receptacle 4 which receptacle serves not only to store the manufactured ice pieces at sub-freezing temperatures but the receptacle 4 also forms part of an ice dispenser designed to automatically dispense the stored ice pieces as required by the user.

The receptacle 4, which is removably supported on a supporting shelf 5 below the ice maker 3, is relatively wide and relative shallow and includes vertical front and rear walls 9 and 10 and an arcuate or concave bottom wall 11. The front wall 9 of the receptacle 4 is provided with a dispensing opening 14. Adjacent and in front of the dispensing opening 14 is a metal plate 18 secured to the receptacle 4 which metal plate has an opening 19 to allow ice pieces to pass therethrough.

For the purpose of conveying ice pieces stored in the receptacle 4 to the discharge opening 14, there is provided within the receptacle 4 a dispensing means generally indicated by the number 15. It extends lengthwise of the receptacle 4 adjacent the lowermost portion of the arcuate bottom wall 11 and in alignment with the discharge opening 14 and is pivotally supported in a horizontal position on the front and rear walls 9 and 10 of the receptacle 4 for rotational movement about its horizontal axis. It essentially comprises a feed section 16 at the front end thereof and a conveyor section 17 connected to the feed section and forming the rear portion of the dispensing means.

The feed section 16 as illustrated in FIGS. 1, 2 and 3 of the drawing, comprises an open ended sleeve or collar 20 containing a conveyor screw in the form of two auger blades 21 which forms within the collar 20 two diametrically opposed helical passages or flutes 22 of a cross-sectional area such that ice pieces entering the inlet end 23 of the feed section advance through the passages or flutes 22 during rotation of the feed section 16. The feed section is of a length such that during normal operation of the dispenser, a plurality of ice pieces are stored within each of the passages 22 so that a controlled number of ice pieces can be discharged through the discharge opening 14 upon each half revolution of the feed section.

There is provided at the inlet end 23 of the feed section 16 a metal member 27 which in the preferred embodiment is a somewhat sharp inlet blade engaging and spanning the inlet end 23 at the rear edges of the auger blades 21. The inlet blade 27 is positioned relative to the rear edges of the auger blades so that its edges in effect lead the auger blade edges during rotation of the feed section to provide a relatively sharp means for engaging and breaking ice clumps. In addition, since the blade 27 overhangs or leads the inlet edges of the blades 21, this overhang restricts the effective inlet area of the passages 22 and further assures that once an ice piece has passed this point and entered the feed section, it will flow freely through the feed section. The feed section 16 is rotatably supported at the front end of the receptacle 4 and is positioned in a shallow arcuate depression 36 in the bottom wall of the receptacle. The lower part of collar 20 is spaced a short distance from this depression 36 and the depression is of a depth such that the inner surface 35 of the collar is below the adjacent surface portion 37 of the receptacle bottom wall rearwardly of the feed section 16 to facilitate entrance of ice pieces into the feed section. As ice chips or fragments tend to collect in this depression 36, the outer surface of the collar 20 is also preferably provided with an external helical rib 38 having a pitch opposite to that of the blades 29. Thus during rotation of the feed section to advance ice pieces through the feed section to the outlet 14, the reverse pitch of the exterior ribs 38 sweeps ice chips and fragments rearwardly to maintain the space between the feed section 16 and the arcuate depression 36 substantially free of such chips and fragments.

In accordance with the present invention the conveyor section 17 comprises a rotatable wire auger 40 and includes an elongate axial portion 42 secured to the cylindrical, rotatable feed section 16 at one end 44 and at the opposite end 46 to a helically coiled portion 48 which is concentric therewith and spaced therefrom. The helically coiled portion 48 has a terminal end 50 spaced from the feed section 16 and the axial portion 42 of the auger. The one end 44 of the elongate axial portion 42 is secured to the feed section 16 by means of the inlet blade 27 which in the preferred embodiment is made of rigid metal. The elongate axial portion 42 may be flattened in the one end 44 to be inserted into a complimentary slightly larger rectangular shaped opening through the center of the inlet blade 27 so that upon rotation of the elongate axial portion 42 the feed section 16 will be rotated in unison therewith. It will be noted that the flattened one end 44 of the elongate axial portion 42 extends through the central axis of the collar 20 and is rotatably secured by a bearing nut 30 to a housing portion 31 of the dispensing means 15. In ice makers that have an ice crusher option, blades 52, which are utilized for crushing ice pieces during operation of the dispensing means, are secured to the one end 44 of the axial portion 42 just ahead of the bearing nut 30 and within housing portion 31.

The wire auger 40 is a one piece wire construction and the elongate axial portion 42 and the helically coiled portion 48 have a transitional section 54 therebetween with a portion 56 being bent perpendicular to the axial portion 42 to form key means for connecting the drive means 58 to rotate the auger and feed section. The drive means 58 (FIG. 1) consists of an electric motor 60 which through appropriate transmission means drives a bifurcated yoke 62 which engages the bent portion 56 of the wire auger 40 so that upon rotation of the yoke 62 the wire auger and feed section will be rotated in unison.

With reference particularly to FIGS. 4 and 5 it can be seen that the helically coiled portion 48 is a circular helix with all of the coil portion being equal distance from the elongated axial portion 42. In addition the major part of the helically coiled portion particularly the two coils preceding the terminal end 50 has the coils all of the same pitch except for the transitional section as best seen in FIG. 2. With this configuration the ice pieces are moved or conveyed from the receptacle to the feed section. It will also be noted that the terminal end 50 is spaced from the inner end 23 of the collar 20 which is spanned by the inlet blade 27 a substantial distance. The purpose of this spacing is so that ice pieces being transferred along the helically coiled portion 48 have a smooth flow path to the feed section 16. On occasion ice pieces have a tendency to freeze together into a large clump around the auger. With the helically coiled portion 48 configuration of this invention as the auger rotates the ice piece clump is non-rotatably moved along the coiled portion 48 and will eventually abut the inlet blade 27 and the cylindrical shell 20. Upon continuing operation or rotation of the auger the ice piece clump will be forced against the rigid inlet blade 27 and will be broken up and dispersed so as not to interfere with the orderly introduction of ice pieces from the conveyor section 17 into the feed section 16.

During operation of the dispenser by energization of the drive means 58, ice pieces stored in the receptacle 4 are continuously conveyed by the conveyor 17 to the inlet end 23 of the collar 20 of feed section 16. As the inlet end of one of the helical passages 22 rotates below the level of ice at this point in the receptacle, ice pieces are picked up by the inlet blade 27 and passed or dropped into one of the passages 22. Any ice piece that can enter the restricted inlet to a passage 22 will then flow freely to the outlet end of the feed section. Also as has been previously described the leading edge of the inlet blade and the terminal end 50 of the helical coiled portion 48 aid in breaking up clumps of ice pieces and will allow the broken up clumps to enter the feed section which might otherwise interfere with the ice piece flow. The distance that terminal end 50 of the wire auger 40 is spaced from the feed section and in particular the inlet blade 27 can vary, however, as mentioned previously, it should be a distance sufficient to allow small clumps or clusters of ice pieces that may form themselves around the wire of the helical coil to drop off the terminal end and be conveyed along with individual cubes into the helix feed section. The distance should be small enough that large clumps are subjected to the crushing action between the rotating auger terminal end 50 and the blade 27.

While there has been shown and described a specific embodiment of the invention, it will be understood that it is not limited thereto and it is intended by the appended claims to cover all such modifications as fall within the true spirit and scope of the invention.

What is claimed is:

1. An ice piece dispenser comprising:

a receptacle for storing ice pieces and having a front discharge opening therein;

dispensing means supported in said receptacle and including:

a cylindrical, rotatable feed section having the outer end thereof positioned adjacent said discharge opening and the inner end thereof having an opening to receive ice pieces and spanned by a metal member which is secured thereto, a rotatable wire auger comprising an elongate axial portion secured to the cylindrical rotatable feed section at one end and at the opposite end to a helically coiled portion that is radially spaced from and surrounds a major section of the elongated axial portion and extends therealong in a direction toward the feed section, said helically coiled portion having a free terminal end and being unconnected to the elongated axial portion of the auger throughout the length it extends along the elongated axial portion and the free terminal end is spaced from the feed section a distance sufficient to allow small clusters of ice pieces formed around the helical coil to drop off the terminal end and small enough that large clumps of ice pieces are subjected to a crushing action between the terminal end and the metal member of the feed section; and drive means to rotate the feed section and auger.

2. The ice piece dispenser of claim 1 wherein the elongate axial portion and helically coiled portion of the rotatable wire auger is a one piece wire construction.

3. The ice pice dispenser of claim 1 wherein the receptcle for storing ice pieces has secured thereto a plate that has an opening therein in communication with the receptacle front discharge opening.

4. The ice piece dispenser of claim 1 wherein the helically coiled portion with the terminal end is a circular helix.

5. The ice piece dispenser of claim 4 wherein a major part of the helically coiled portion has coils substantially the same pitch.

6. The ice piece dispenser of claim 1 wherein the elongate axial portion of the rotatable wire auger is secured to the feed section and rotation of the auger by the drive means rotates the feed section in unison.

7. The ice piece dispenser of claim 6 wherein the elongate axial portion and the helically coiled portion of the rotatable wire auger have a transitional section therebetween with the wire being bent perpendicular to the axial portion to form key means to connect the rotatable wire auger to the drive means to rotate the auger and feed section.

* * * * *